United States Patent Office 3,079,384
Patented Feb. 26, 1963

3,079,384
C-RING SUBSTITUTED 6α-HALO STEROIDS AND PROCESS FOR PRODUCING THEM
Patrick A. Diassi, Westfield, and Pacifico A. Principe, New Brunswick, N.J., assignors to Olin Mathieson Chemical Corporation, New York, N.Y., a corporation of Virginia
No Drawing. Filed Oct. 10, 1960, Ser. No. 61,388
19 Claims. (Cl. 260—239.55)

This invention relates to the preparation of new compounds which are primarily of advantage in the synthesis of C-ring substituted 6α-halo steroids and to methods of producing such compounds.

In general this invention involves the conversion of compounds of the formula (I)
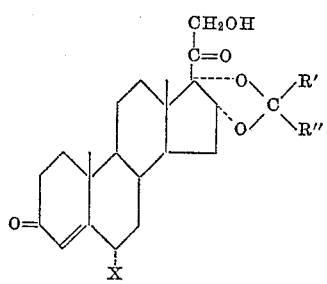

by a series of steps described in detail below by way of new intermediates ultimately to compounds of the formula (II)
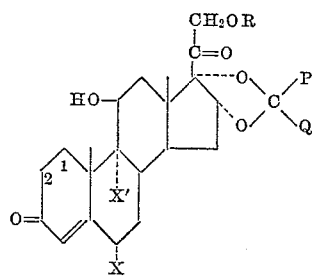

The symbols in Formulas I and II have the following meanings: R' and R" each represents hydrogen, lower alkyl (e.g. straight or branched chain aliphatic hydrocarbon groups such as methyl, ethyl, propyl, isopropyl, butyl, isobutyl, etc.), halogenated lower alkyl (e.g. trifluoromethyl or 2,2,2-trifluoroethyl), monocyclic cycloalkyl, (e.g. cyclopentyl, cyclohexyl etc.), monocyclic aryl (e.g. phenyl or o-, m- or p-tolyl) and monocyclic aralkyl (e.g. phenyl lower alkyl such as benzyl or phenethyl); R represents hydrogen or an acyl radical of a hydrocarbon carboxylic acid, preferably of less than 10 carbon atoms (e.g. lower alkanoic acids such as acetic, propionic, enanthic acids and the like), a monocyclic aryl carboxylic acid (e.g. benzoic acid), a monocyclic aralkanoic acid (e.g. a phenyl lower alkanoic acid such as phenylacetic acid, etc.), a cycloalkanoic or cycloalkenoic acid containing 3 to 6 carbon atoms in the ring, a monocyclic aralkenoic acid (e.g. a phenyl lower alkenoic acid such as cinnamic acid), or a lower alkenoic acid; X and X' each represents a halogen, especially chlorine and fluorine, which may be the same or different in an individual compound; and P and Q are independently selected from the group which consists of the radicals represented by R' and R" (i.e. hydrogen, lower alkyl, halogenated lower alkyl, monocyclic cycloalkyl, monocyclic aryl, or monocyclic aralkyl), as well as monocyclic heterocyclic e.g. piperidine, piperazino, 4-methylpiperazino and pyrrolidino) or monocyclic heterocyclic lower alkyl (e.g. piperidinomethyl, pyrrolidinomethyl, furfuryl, thenyl and the like), nitrogen heterocyclics being preferred. In addition, R' and R" or P and Q may be joined together in an alkylene group of 3 to 5 carbon atoms or a monoazaalkylene group of 3 to 4 carbon atoms forming a cyclic hydrocarbon or nitrogen heterocyclic group together with the carbon to which they are attached.

In Formula II, the 1- and 2-positions may be saturated or they may be joined by a double bond. In other words the end products to which the intermediate of this invention leads are compounds of Formula II with positions 1 and 2 saturated as well as their 1,2-dehydro analogs.

In the first step of the process, which constitutes a principal feature of this invention, a compound of Formula I is subjected to the action of a microorganism of the genus Colletotrichum, e.g. C. phomoides, C. pisi, C. linicolae, etc., or the genus Tricothecium, e.g. T. roseum, T. flagrans, T. domesticum, etc. Colletotrichum phomoides and Tricothecium roseum are preferred. This results in the selective introduction of an 11α-hydroxy group to yield a corresponding compound of the formula (III)
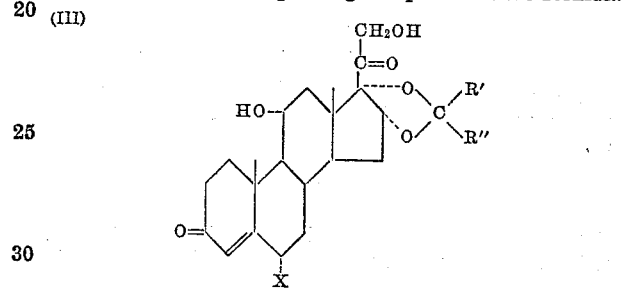

R', R" and X have the same significance in Formula III as they have in Formula I.

The hydroxylation can best be effected either by including the steroid of Formula I in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds for the production of antibiotics and/or riboflavin.

The microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid. The source of nitrogenous factors may be natural (e.g., soybean meal, corn steep liquor, meat extract and/or distillers solubles) or synthetic (i.e. composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g. within the range of about 6 to 96 hours.

In the fermentation step described above, it is desirable to use a starting material containing only hydrogen or hydrocarbon substituents in the 16,17-acetal or ketal moiety, i.e. R' and R" represent hydrogen or a hydrocarbon group. If, however, a product is desired containing basic groups such as those answering the description of the symbols P and Q such groups may be introduced into the hydroxylation products of Formula III.

It is frequently convenient to carry out the 11α-hydroxylation step described above with an acetonide of Formula I, that is a compound of that formula in which R' and R" each represents methyl. Then any other group desired in the 16,17-positions may be introduced after the fermentation procedure has been completed.

The conversion of the acetonide or similar group may be effected by hydrolyzing the compound of Formula III, e.g. by treating successively with formic acid, then sodium carbonate to produce a compound of the formula (IV)

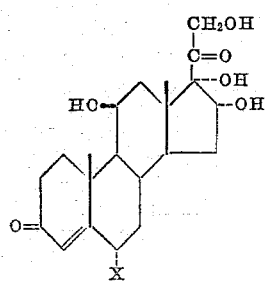

The compound of Formula IV is then reacted with an aldehyde or ketone in perchloric acid which bears the desired substituent groups corresponding to the formula (V)

The meaning of the symbols P and Q has already been defined. In this manner a compound having the formula (VI)

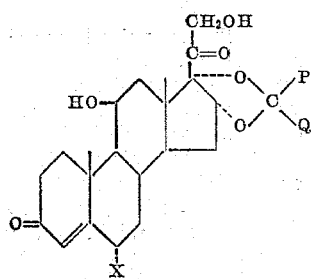

is readily obtained.

The final products of Formula II include an additional halogen atom and, optionally, an additional double bond not in the starting materials of Formula I or the 11α-hydroxylated compounds of Formulas III or VI. These may be introduced into the molecule in optional sequence and thus several alternate routes may be followed after a compound of Formula III or Formula VI has been obtained.

According to one alternative, a double bond is introduced into the 1,2-position of the compound of Formula VI. This may be accomplished by enzymatic dehydrogenation with *Bacterium cyclooxydans* in accordance with the procedure of Example 1 of U.S. Patent No. 2,822,318. Acylation with an agent capable of converting the 21-hydroxy group to a 21-acyloxy group, e.g. acyl halides, preferably acyl chlorides, or acid anhydrides having acyl radicals corresponding to R yields a product of the formula (VII)

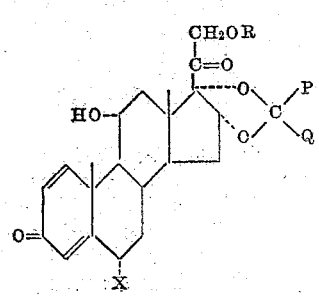

The acylation reaction is preferably conducted at about room temperature in the presence of an organic nitrogen base such as pyridine, collidine, triethanolamine, or the like.

The compounds of Formula VII may also be produced by chemical methods, e.g. by first acylating a compound of Formula VI to obtain a compound of the formula (VIII)

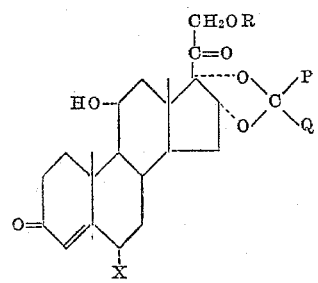

as described above, then selectively dehydrogenating, e.g. by treating the latter with 2,3-dichloro-5,6-dicyanobenzoquinone.

The next step in the process entails the conversion of the compound of Formula VII to a compound of the formula (IX)

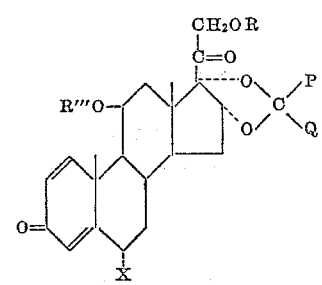

P, Q, R and X have the significance already defined. R''' represents an alkylsulfonyl or monocyclic arylsulfonyl group, e.g. a lower alkylsulfonyl group such as methanesulfonyl, ethanesulfonyl, and the like, phenylsulfonyl or a substituted phenylsulfonyl group, especially lower alkylbenzenesulfonyl such as p-toluenesulfonyl or halobenzenesulfonyl such as p-bromobenzenesulfonyl. Methanesulfonyl and p-toluenesulfonyl groups are preferred. Suitable sulfonylating agents which may be used are R'''-halides such as R'''-bromides and especially R'''-chlorides such as methanesulfonyl chloride and p-toluenesulfonyl chloride.

Compounds of Formula II in which the 9,11-position is double bonded are then prepared from compounds of Formula IX by treating the latter with an alkali metal salt of a lower fatty acid such as sodium acetate in a substantially anhydrous lower fatty acid medium such as acetic acid, treating the corresponding $\Delta^{9,11}$-derivative thus formed, with an agent capable of effecting the addition of hypobromous acid to the 9,11 double bond, e.g. a mixture of a strong acid, such as perchloric, toluene sulfonic or trichloroacetic acids, an N-bromoamide or imide such as N-bromoacetamide or N-bromosuccinimide and dioxane. The resulting 9α,11β-bromohydrin is dehydrobrominated by treatment with a base such as sodium acetate or potassium acetate to the corresponding 9β,11β-oxide. The latter is finally treated with a hydrohalide such as hydrogen chloride or hydrogen fluoride in an organic solvent medium to give the compounds of Formula II. If desired, the group R in position 21 and the acetal or ketal group in positions 16, 17 may be removed from the compounds of Formula II by cleaving, for example with formic acid, then hydrolyzing with alkali, for example potassium bicarbonate.

According to another modification of this invention a compound of Formula VI is acylated to obtain a compound of Formula VIII as described above. The compound of Formula VIII is then treated with a sulfonylating agent in the same manner as described above with respect to the production of compounds of Formula IX. In this instance the sulfonylation reaction yields compounds of the formula (X)

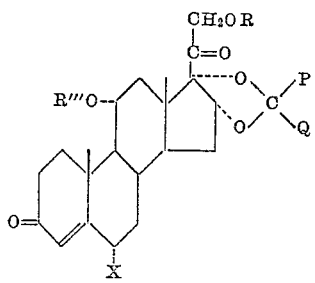

The symbols in the above formula have the same significance as described previously. Dehydrogenation of compounds of Formula X by chemical or microbiological means such as those already described yields also compounds of Formula IX which may be further processed as indicated above.

The compounds of Formula II are obtained from those of Formula X by treating the latter with an alkali metal salt of a lower fatty acid in a substantially anhydrous lower fatty acid medium, reacting the $\Delta^{9,11}$-derivative thus obtained with an agent which effects the addition of hypobromous acid to the 9,11-double bond, dehydrobrominating the resulting $9\alpha,11\beta$-bromhydrin with an aqueous inorganic base to obtain the corresponding $9\beta,11\beta$-oxide and finally reacting the latter with a hydrohalide in an organic solvent.

It is also possible, according to a third modification of this invention to oxidize compounds of Formula VIII e.g. with chromic anhydride-sulfuric acid in acetone-dioxane to obtain compounds of the formula (XII)

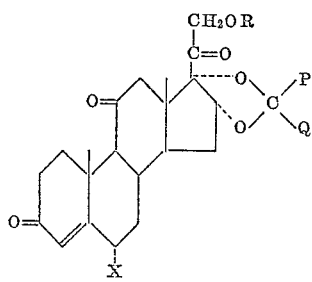

These in turn may be selectively dehydrogenated, e.g. with 2,3-dichloro-5,6-dicyanobenzoquinone in dioxane, to obtain compounds of the formula (XIII)

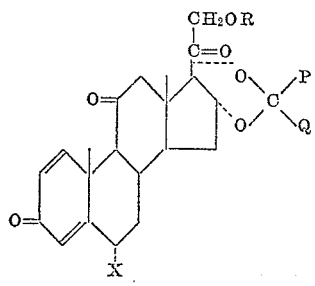

The starting materials of Formula I are prepared from $\Delta^{5,16}$-pregnadiene-$3\beta,21$-diol-20-one 21-acetate in accordance with the procedure reported in J.A.C.S., 81, 1264 (1959), and J.A.C.S., 82, 3399 (1960), by successive treatment with potassium permanganate and a ketone or aldehyde plus perchloric acid to give $\Delta^5$-pregnene-$3\beta,16\alpha,17\alpha,21$-tetrol-20-one 16, 17-ketal or 16,17-acetal. The acetal or ketal moiety corresponds to the ketone or aldehyde used in the reaction. Aldehydes of the formula

in which R' and R'' have the significance already defined, are used for this purpose. Monoperphthalic acid treatment of the ketal or acetal gives the $5\alpha,6\alpha$-oxide. Fission with boron trifluoride or boron trichloride in ether benzene yields the corresponding $5\alpha$-hydroxy-$6\beta$-fluoro or $5\alpha$-hydroxy-$6\beta$-chloro compound which is converted to $6\alpha$-fluoro or $6\alpha$-chloro-$16\alpha$-hydroxycortexolone 16,17-ketal (or acetal) 21-acetate by chromium trioxide oxidation followed by treatment with anhydrous hydrogen chloride in acetone. The latter can be deacylated by hydrolysis with dilute alkali such as potassium carbonate or potassium hydroxide in the absence of oxygen to obtain the desired starting material.

The compounds of Formula II exhibit anti-inflammatory activity similar to that of cortisone and hydrocortisone and can thus be used in human and veterinary medicine for the treatment of conditions such as rheumatoid arthritis or adrenocortical hormone insufficiency, for which purpose they are administered in the same manner and in lieu of cortisone and hydrocortisone, the dosage being adjusted to account for the degree of activity of the individual steroid. Selected intermediates exert similar activity.

The following examples are illustrative of the invention. All temperatures are expressed in degrees centigrade.

EXAMPLE 1

*$6\alpha$-Fluoro-$16\alpha$-Hydroxyepihydrocortisone 16,17-Acetonide*

Surface growth from a culture of *Tricothecium roseum* maintained on Gould agar of the following composition:

| | Gms. |
|---|---|
| Agar | 20 |
| Glucose | 10 |
| Yeast extract | 2.5 |
| Potassium phosphate | 1 |

Distilled water to 1 liter.
Sterilized for 20 minutes at 15 p.s.i.

is suspended in 5 mls. of 0.01% Duponol solution [Merck Index, 7th edition (1960), p. 472]. 1 ml. portions of this suspension are used to inoculate eight 250 ml. Erlenmeyer flasks containing 50 mls. of corn steep medium of the following composition:

| | | |
|---|---|---|
| Corn steep liquor | gms./liter | 6 |
| $NH_4H_2PO_4$ | do | 3 |
| $CaCO_3$ | do | 2.5 |
| Soybean oil | do | 2.2 |

Steroid
Distilled water to 1 liter

| | | |
|---|---|---|
| Yeast extract | gms | 2.5 |
| Dextrose | gms | 10 |

The flasks are then incubated at 25° C. on a rotary shaker (280 cycles/min.; 2 inch radius) for 72 hours after which a 10% by volume transfer is made from these flasks to each of seven two liter Erlenmeyer flasks containing 500 mls. of corn steep medium of the hereinbefore described composition. At the same time, there is added to each flask 2.5 mls. of a 60 mg./ml. solution of $6\alpha$-fluoro-$16\alpha$-hydroxycortexolone 16,17-acetonide in N,N-dimethylformamide (DMF). The flasks each having a final steroid concentration of 300 gamma/ml. are then incubated on a rotary shaker (280 cycles/minute; 2 inch radius).

Whole broth samples are taken for analysis at 24 hour intervals after the addition of the steroid. Each 8 ml. broth sample is extracted with 1 ml. of methyl isobutyl ketone (MIBK) and the MIBK extracts, spotted at 0.1 ml. and 0.2 ml. intervals on Whatman No. 1 paper are chromatographed on a toluene-propylene glycol system for three hours. The chromatograms are examined under U.V. for the presence of the steroid substrate.

Four days after steroid addition, the broth from each of the flasks is filtered directly through a Buchner-Seitz clarifying pad apparatus with suction. The combined filtrates are extracted three times with 1300 ml. portions of chloroform. The chloroform extracts are combined, washed twice with 1500 ml. of water and evaporated to dryness in vacuo. The residue (about 930 mgs.) is crystallized from acetone-hexane to give about 284 mgs. of 6α-fluoro-16α-hydroxyepihydrocortisone 16,17 - acetonide having the following physical characteristics: M.P. 264–266°; $[\alpha]_D^{22}+102°$ (chlf.); U.V.

$\lambda_{max.}^{alc.}$ 237 m$\mu$ ($\epsilon=13,100$) $\lambda_{max.}^{Nujol}$ 2.86, 5.92, 6.04 (sh) 6.17$\mu$

*Analysis.*—Calc'd for $C_{24}H_{33}O_6F$ (436.50): C, 66.04; H, 7.62; F, 4.35. Found: C, 66.17; H, 7.36; F, 3.71.

EXAMPLE 2

*16,17-Acetophenone Derivative of 6α-Chloro-16α-Hydroxyepihydrocortisone*

Following the procedure of Example 1 identically except for the substitution as steroid substrate of 6α-chloro-16α - hydroxycortexolone 16,17 - acetophenone derivative there is obtained as product, the 16,17-acetophenone derivative of 6α-chloro-16α-hydroxyepihydrocortisone [6α-chloro-16,17 - (α-methyl)benzylidenedioxyepicorticosterone].

EXAMPLE 3

*6α-Fluoro-16α-Hydroxyepihydrocortisone 16,17-Acetonide*

Surface growth from a culture of *Colletotrichum phomoides* maintained on Gould agar of the following composition:

|  | Gms. |
|---|---|
| Agar | 20 |
| Glucose | 10 |
| Yeast extract | 2.5 |
| Potassium phosphate | 1 |

Distilled water to 1 liter
Sterilized for 20 minutes at 15 p.s.i.

is suspended in 5 mls. of 0.01% Duponol solution. 1 ml. portions of this suspension are used to inoculate eight 250 ml. Erlenmeyer flasks containing 50 mls. of a nutrient medium of the following composition:

|  | Gms. |
|---|---|
| Starch | 20 |
| Malted cereal extract syrup | 10 |
| Peptone | 20 |
| Cerelose | 44 |
| NaNO$_3$ | 3 |
| KH$_2$PO$_4$ | 1 |
| KCl | 0.5 |
| MgSO$_4$.7H$_2$O | 0.5 |
| FeSO$_4$ | 0.01 |

Tap water to 1 liter
Sterilized 20 minutes at 15 p.s.i.

The flasks are then incubated at 25° C. on a rotary shaker (280 cycles/min.; 2 inch radius) for 72 hours after which a 10% by volume transfer is made from these flasks to each of six two-liter Erlenmeyer flasks containing 500 mls. of medium of the following composition:

|  | Gms. |
|---|---|
| NaNO$_3$ | 3 |
| Glucose | 40 |
| KH$_2$PO$_4$ | 1 |
| Agar | 1 |

Tap water to 1 liter
Sterilized 20 mins. at 15 p.s.i.

At the same time, there is added to each flask 2.5 mls. of 60 mg. per ml. solution of 6α-fluoro-16α-hydroxycortexolone 16,17-acetonide in N,N-dimethylformamide (DMF). The flasks, each having a final steroid concentration of 300 gamma/ml., are then incubated on a rotary shaker (280 cycles/min.; 2 inch radius).

Whole broth samples are taken for analysis at 24 hour intervals after the addition of the steroid. Each 8 ml. broth sample is extracted with 1 ml. of methyl isobutylketone (MIBK) and the MIBK extracts, spotted at 0.1 ml. and 0.2 ml. intervals on Whatman No. 1 paper, are chromatographed on a toluene-propylene glycol system for three hours. The chromatograms are developed and examined under U.V. for the presence of the steroid substrate.

Seven days after steroid addition the broth from each of the flasks is filtered directly through a Buchner-Seitz clarifying pad apparatus with suction. The combined filtrates are extracted there times with 1000 ml. portions of MIBK chloroform. The MIBK extracts are combined, washed twice with 1500 ml. of water and evaporated to dryness in vacuo. The residue (about 991 mgs.) is crystallized from acetone-hexane to give about 285 mgs. of 6α-fluoro - 16α - hydroxyepihydrocortisone 16,17 - acetonide identical with the product of Example 1.

EXAMPLE 4

*16α,17α-Cyclohexylidene Derivative of 6α-Fluoro-16α-Hydroxyepihydrocortisone*

Following the procedure of Example 3 identically except for the substitution of the 16,17-cyclohexanone derivative of 6α-fluoro-16α-hydroxyepicortexolone as the steroid substrate, there is obtained as product, the 16,17-cyclohexylidene derivative of 6α-fluoro-16α-hydroxyepihydrocortisone.

EXAMPLE 5

*6α-Fluoro-16α-Hydroxyepiprednisolone 16,17-Acetonide and 6α-Chloro-16α-Hydroxyepiprednisolone 16,17-Acetophenone Derivative*

Following the procedure of Example 1 of U.S. Patent No. 2,822,318, 100 mg. of 6α-fluoro-16α-hydroxyepihydrocortisone 16,17-acetonide is converted to the product 6α-fluoro-16α-hydroxyepiprednisolone 16,17-acetonide.

In the same manner, the product of Example 2 is converted to the 16,17-acetophenone derivative of 6α-chloro-16α-hydroxyepiprednisolone.

EXAMPLE 6

*6α-Fluoro-16α-Hydroxyepihydrocortisone 16,17-Acetonide 21-Acetate*

To 100 mg. of 6α-fluoro-16α-hydroxyepihydrocortisone 16,17-acetonide are added 1.1 ml. of a solution of 108.7 mg. of acetic anhydride in 5 ml. of pyridine and the resulting solution is stoppered and left at room temperature for 16 hours during which time crystals separated. The solution is diluted slowly with 2 ml. of ice water and the crystals are filtered off, washed with water and dried to give about 78.6 mg. of 6α-fluoro-16α-hydroxyepihydrocortisone 16,17-acetonide 21-acetate of the following characteristics: M.P. about 293–295°; $[\alpha]_D+88°$ (chlf.);

$\lambda_{max.}^{alc.}$ 237 m$\mu$ ($\epsilon=15,500$); $\lambda_{max.}^{Nujol}$ 2.80, 5.78, 5.86, 6.00, 6.16$\mu$

*Analysis.*—Calc'd for $C_{26}H_{35}FO_7$ (478.54); C, 65.25; H, 7.37; F, 3.98. Found: C, 64.79; H, 7.36; F, 3.61.

EXAMPLE 7

*6α-Fluoro-16α-Hydroxyepiprednisolone 16,17-Acetonide 21-Acetate*

Following the procedure of Example 6, 6α-fluoro-16α-hydroxyprednisolone 16,17-acetonide is acetylated to obtain 6α-fluoro-16α-hydroxyepiprednisolone 16,17-acetonide 21-acetate.

EXAMPLE 8

*6α-Fluoro - 16α - Hydroxyepihydrocortisone 16,17-Acetonide 21-Propionate and 6α-Chloro-16α-Hydroxyepihydrocortisone 21-Acetate 16,17-Acetophenone Derivative*

Following the procedure of Example 6 identically except for the substitution of 137 mgs. of propionic anhydride for the acetic anhydride used therein, there is obtained the product 6α-fluoro-16α-hydroxyepihydrocortisone 16,17-acetonide 21-propionate.

In the same manner as in Example 6, the product of Example 2 is converted to the 16,17-acetophenone derivative of 6α-chloro-16α-hydroxyepihydrocortisone 21-acetate.

EXAMPLE 9

*6α-Fluoro-16α-Hydroxyepihydrocortisone 11-Mesylate 16,17-Acetonide 21-Acetate*

To a stirred suspension of 50 mg. of 6α-fluoro-16α-hydroxyepihydrocortisone 16,17-acetonide 21-acetate in 1.0 ml. of chloroform and 1.0 ml. of pyridine, cooled in an ice bath, is added 1.0 ml. of a solution of 0.1 ml. of methanesulfonyl chloride in 5.0 ml. of chloroform and the mixture is stirred at 0° for 16 hours. The mixture is diluted with 5 ml. of chloroform and then 3 ml. of ice water is added slowly. The chloroform layer is separated, washed successively with 2 N HCl, 5% NaHCO₃ and water and then evaporated to dryness. Crystallization of the residue from acetone-hexane gives 6α-fluoro-16α-hydroxyepihydrocortisone 11-mesylate 16,17-acetonide 21-acetate, M.P. 175–177°.

EXAMPLE 10

*6α-Fluoro-16α-Hydroxyepihydrocortisone-11-Tosylate 16,17-Acetonide 21-Acetate*

Following the procedure of Example 9 except for the substitution of 50 mg. of tosyl chloride for the methanesulfonyl chloride solution used therein there is obtained the product 6α - fluoro - 16α - hydroxyepihydrocortisone 11-tosylate 16,17-acetonide 21-acetate.

EXAMPLE 11

*16,17-Acetophenone Derivative of 6α-Chloro-16α-Hydroxyepihydrocortisone 11-Mesylate 21-Acetate*

Following the procedure of Example 9 except for the use as starting material of the 16,17-acetophenone derivative of 6α-chloro-16α-hydroxyepihydrocortisone 21-acetate as the starting material there is obtained the 16,17-acetophenone derivative of 6α-chloro-16α-hydroxyepihydrocortisone 11-mesylate 21-acetate.

EXAMPLE 12

*6α-Fluoro-16α-Hydroxyepiprednisolone 16,17-Acetonide 21-Acetate*

A solution of 100 mg. of 6α-fluoro-16α-hydroxyepihydrocortisone 16,17-acetonide 21-acetate and 52 mg. of 2,3-dichloro-5,6-dicyanobenzoquinone in 2 ml. dioxane is refluxed under nitrogen for 6 hours. After cooling, the precipitated 2,3-dichloro-5,6-dicyanohydroquinone is filtered off and washed with 2 ml. dioxane. The filtrate and washings are diluted with 4 ml. of chloroform and adsorbed onto 2 g. of neutral alumina. Elution with chloroform and evaporation of the solvent gives 6α-fluoro-16α-hydroxyepiprednisolone 16,17-acetonide 21-acetate.

EXAMPLE 13

*6α-Fluoro-16α-Hydroxyepiprednisolone 16,17-Acetonide 21-Propionate*

Following the procedure of Example 12 except for the use as starting material of 6α-fluoro-16α-hydroxyepihydrocortisone 16,17-acetonide 21-propionate, there is obtained as product the compound 6α-fluoro-16α-hydroxyepiprednisolone 16,17-acetonide 21-propionate.

EXAMPLE 14

*16,17-Acetophenone Derivative of 6α-Chloro-16α-Hydroxyepiprednisolone 21-Acetate*

Following the procedure of Example 12 except for the use as starting material of the 16,17-acetophenone derivative of 6α-chloro-16α-hydroxyepihydrocortisone 21-acetate there is obtained as product the 16,17-acetophenone derivative of 6α-chloro-16α-hydroxyepiprednisolone 21-acetate.

EXAMPLE 15

*6α - Fluoro - 16α - Hydroxyepiprednisolone 11 - Mesylate 16,17-Acetonide 21-Acetate, 6α-Fluoro-16α-Hydroxyepiprednisolone 16,17-Acetonide 11-Mesylate 21-Propionate and 6α-Chloro-16α-Hydroxyepiprednisolone 11-Mesylate 21-Acetate 16,17-Acetophenone Derivative*

To a stirred suspension of 50 mg. of 6α-fluoro-16α-hydroxyprednisolone 16,17-acetonide 21-acetate in a mixture of 1 ml. of chloroform and 1 ml. of pyridine, cooled in an ice bath, is added 1.0 ml. of a solution of 0.1 ml. of methanesulfonyl chloride in 5.0 ml. of chloroform, and the mixture is kept at 0° for 16 hours. The mixture is diluted with 5 ml. of chloroform and 3 ml. of ice water. The chloroform layer is separated, washed with 2 N HCl, 5% NaHCO₃ and water and evaporated to dryness in vacuo. Crystallization of the residue from acetone-hexane gives 6α-fluoro-16α-hydroxyepiprednisolone 11-mesylate 16,17-acetonide 21-acetate.

In an identical manner the products of Examples 13 and 14 are converted to 6α-fluoro-16α-hydroxyepiprednisolone 16,17-acetonide 11-mesylate 21-propionate and the 16,17-acetophenone derivative of 6α-chloro-16α-hydroxyepiprednisolone 11-mesylate 21-acetate respectively.

EXAMPLE 16

*6α-Fluoro-16α-Hydroxyepiprednisolone 16,17-Acetonide 11-Mesylate 21-Acetate*

In the same manner as in Example 12, the compound of Example 9 is converted to 6α-fluoro-16α-hydroxyepiprednisolone 16,17-acetonide 11-mesylate 21-acetate.

EXAMPLE 17

*6α-Fluoro-16α-Hydroxyepiprednisolone 11-Tosylate-16,17-Acetonide 21-Acetate*

Following the procedure of Example 12, the product of Example 10 is converted to 6α-fluoro-16α-hydroxyepiprednisolone 11-tosylate-16,17-acetonide 21-acetate.

EXAMPLE 18

*16,17-Acetophenone Derivative of 6α-Chloro-16α-Hydroxyepiprednisolone 11-Mesylate 21-Acetate*

Following the procedure of Example 12, the product of Example 11 is converted to 16,17-acetophenone derivative of 6α-chloro-16α-hydroxyepiprednisolone 11-mesylate 21-acetate.

EXAMPLE 19

*6α-Fluoro-16α-Hydroxyepihydrocortisone*

A solution of 128 mg. of 6α-fluoro-16α-hydroxyepihydrocortisone 16,17-acetonide 21-acetate in 3.5 ml. of anhydrous formic acid is warmed at 42° for 22 hours. The solution is then evaporated to dryness in vacuo. The residue is dissolved in 12.8 ml. of oxygen-free methanol and treated with 2.6 ml. of a 10% solution of potassium bicarbonate in water which is also free of oxygen. The reaction is left under nitrogen at room temperature for 30 minutes and then neutralized with 2.6 ml. of 10% acetic acid. Addition of 5 ml. of water followed by careful evaporation of the methanol in vacuo gives crystalline 6α-fluoro-16α-hydroxyepihydrocortisone.

EXAMPLE 20

*Furfural Derivative of 6α-Fluoro-16α-Hydroxyepihydrocortisone*

To a solution of 3.6 ml. of furfural containing .004 ml. of 70% perchloric acid, 119 mg. of 6α-fluoro-16α-hydroxyepihydrocortisone is added and the mixture stirred at room temperature for 2 hours. The solution is then neutralized with dilute sodium bicarbonate, water and chloroform are then added and the chloroform layer is separated and concentrated in high vacuum. Crystallization of the residue gives the furfural derivative of 6α-fluoro-16α-hydroxyepihydrocortisone.

EXAMPLE 21

*6α-Fluoro-16α-Hydroxycortisone 16,17-Acetonide 21-Acetate*

To a solution of 100 mg. of 6α-fluoro-16α-hydroxyepihydrocortisone 16,17-acetonide 21-acetate in 3.0 ml. of reagent grade acetone, 1.0 ml. of an aqueous solution containing 20 mg. chromic anhydride and 32 mg. sulfuric acid is added dropwise with stirring. After 10 minutes a few drops of methanol are added to decompose the excess oxidizing agent. The solution is decanted from the precipitated chromic sulfate then diluted with water and extracted with chloroform. The chloroform solution is washed with water and evaporated to dryness in vacuo. Crystallization of the residue from acetone-hexane gives 93.1 mg. of 6α-fluoro-16α-hydroxycortisone 16,17-acetonide 21-acetate, M.P. 262–264°, $$\lambda_{max.}^{EtOH} \ 234 \ m\mu \ (\epsilon = 13,300)$$

*Analysis.*—Calc'd for $C_{26}H_{33}O_7F$ (476.32): C, 65.55; H, 6.99; F, 4.40. Found: C, 65.79; H, 6.86; F, 4.30.

EXAMPLE 22

*6α-Fluoro-16α-Hydroxyprednisone 16,17-Acetonide 21-Acetate*

Following the procedure of Example 5, the product of Example 21 is converted to 6α-fluoro-16α-hydroxyprednisone 16,17-acetonide 21-acetate.

The invention may be otherwise variously embodied within the scope of the appended claims.

What is claimed is:

1. A compound of the formula

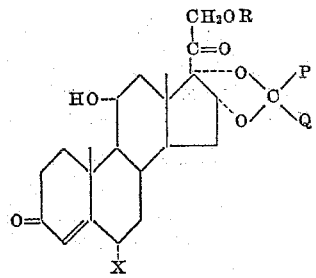

wherein R represents a member of the group consisting of hydrogen and the acyl radical of a hydrocarbon carboxylic acid of less than 10 carbon atoms, X represents halogen and P and Q each represents a member of the group consisting of hydrogen, lower alkyl, halo-lower alkyl, phenyl, phenyl lower alkyl, cycloalkyl, monocyclic heterocyclic, monocyclic heterocyclic lower alkyl, and, together with the carbon atom to which they are attached, a member of the group consisting of cycloalkyl and monocyclic heterocyclic, the halogens being selected from the group consisting of chlorine and fluorine.

2. A compound of the formula

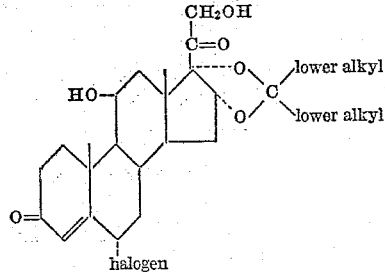

the halogens being selected from the group consisting of chlorine and fluorine.

3. 6α-fluoro-16α-hydroxyepihydrocortisone 16,17-acetonide.

4. 16,17-acetophenone derivative of 6α-chloro-16α-hydroxyepihydrocortisone.

5. 6α-fluoro-16α-hydroxyepihydrocortisone 16,17-acetonide 21-acetate.

6. A compound of the formula

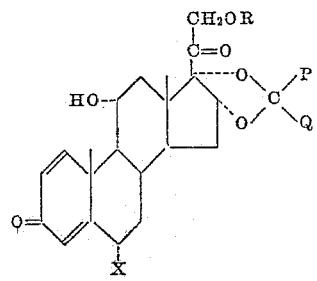

wherein R represents a member of the group consisting of hydrogen and the acyl radical of a hydrocarbon carboxylic acid or less than 10 carbon atoms, X represents halogen and P and Q each represents a member of the group consisting of hydrogen, lower alkyl, halo-lower alkyl, phenyl, phenyl lower alkyl, cycloalkyl, monocyclic heterocyclic, monocyclic heterocyclic lower alkyl, and, together with the carbon atom to which they are attached, a member of the group consisting of cycloalkyl and monocyclic heterocyclic, the halogens being selected from the group consisting of chlorine and fluorine.

7. A compound of the formula

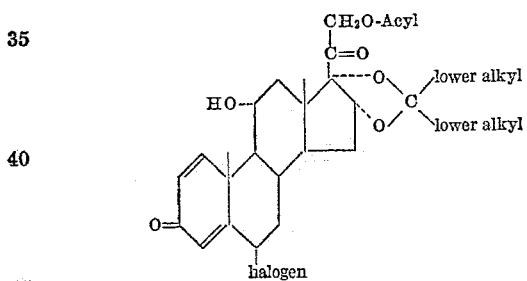

"Acyl" being the acyl radical of a hydrocarbon carboxylic acid of less than 10 carbon atoms and the halogens being selected from the group consisting of chlorine and fluorine.

8. 6α-fluoro-16α-hydroxyepiprednisolone 16,17-acetonide.

9. 16,17-acetophenone derivative of 6α-chloro-16α-hydroxyepiprednisolone.

10. 6α - fluoro - 16α - hydroxyepiprednisolone 16,17-acetonide 21-acetate.

11. A compound of the formula

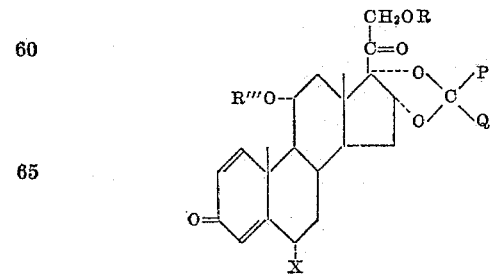

wherein R represents a member of the group consisting of hydrogen and the acyl radical of a hydrocarbon carboxylic acid of less than 10 carbon atoms, X represents halogen and P and Q each represents a member of the group consisting of hydrogen, lower alkyl, halo-lower alkyl, phenyl, phenyl lower alkyl, cycloalkyl, monocyclic heterocyclic, monocyclic heterocyclic lower alkyl, and, together with the carbon atom to which they are attached, a member of the group consisting of cycloalkyl and monocyclic heterocyclic, and R''' represents a member of the group consisting of alkylsulfonyl and monocyclic arylsulfonyl, the halogens being selected from the group consisting of chlorine and fluorine.

12. 6α-fluoro-16α-hydroxyepiprednisolone 11-mesylate 16,17-acetonide 21-acetate.

13. A compound of the formula

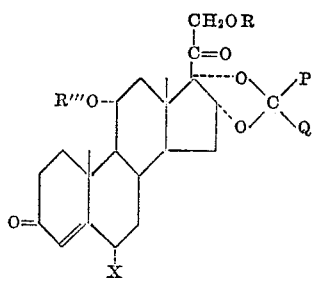

wherein R represents a member of the group consisting of hydrogen and the acyl radical of a hydrocarbon carboxylic acid of less than 10 carbon atoms, X represents halogen and P and Q each represents a member of the group consisting of hydrogen, lower alkyl, halo-lower alkyl, phenyl, phenyl lower alkyl, cycloalkyl, monocyclic heterocyclic, monocyclic heterocyclic lower alkyl, and, together with the carbon atom to which they are attached, a member of the group consisting of cycloalkyl and monocyclic heterocyclic, and R''' represents a member of the group consisting of alkylsulfonyl and monocyclic arylsulfonyl, the halogens being selected from the group consisting of chlorine and fluorine.

14. 6α-fluoro-16α-hydroxyepihydrocortisone 11-mesylate 16,17-acetonide 21-acetate.

15. 6α-fluoro-16α-hydroxyepihydrocortisone 11-tosylate 16,17-acetonide 21-acetate.

16. A process for the production of 11α-hydroxy steroids of the formula

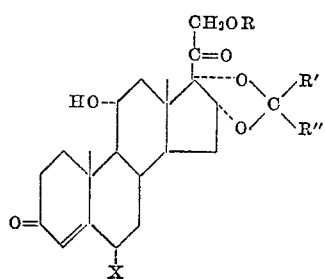

wherein R represents a member of the group consisting of hydrogen and the acyl radical of a hydrocarbon carboxylic acid of less than 10 carbon atoms, R' and R'' each represents a member of the group consisting of hydrogen, lower alkyl, halo-lower alkyl, phenyl, phenyl lower alkyl and cycloalkyl and X represents halogen, which comprises aerobically incubating a compound of the formula

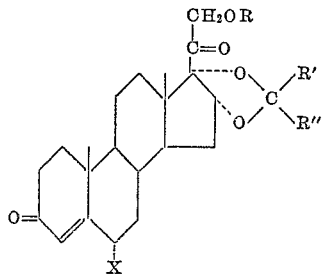

wherein R, R', and R'' and X have the same significance as above, in a nutrient medium comprising an assimilable source of nitrogen, carbon and energy and containing a microorganism of the genus Colletotrichum.

17. A process as in claim 16 wherein the microorganism is *Colletotrichum phomoides*.

18. A process for the production of 11α-hydroxy steroids of the formula

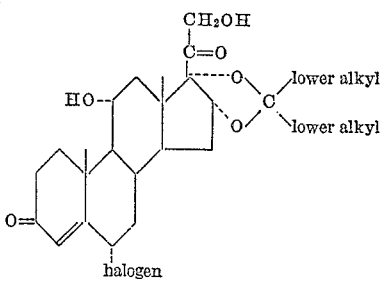

which comprises aerobically incubating a compound of the formula

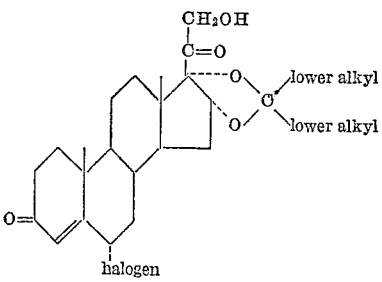

in a nutrient medium comprising an assimilable source of nitrogen, carbon and energy in the presence of *Colletotrichum phomoides*.

19. A process for the production of 6α-fluoro-16α-hydroxyepihydrocortisone 16,17-acetonide which comprises aerobically incubating 6α-fluoro-16α-hydroxycortexolone 16,17-acetonide in a nutrient medium comprising an assimilable source of nitrogen, carbon and energy in the presence of the microorganism *Colletotrichum phomoides*.

References Cited in the file of this patent
UNITED STATES PATENTS
2,925,366   Murray _____ Feb. 16, 1960
OTHER REFERENCES
Syntex, Belgium Patent No. 579,616 (reported in Derwent Belgian Report No. 60A, effective date December 1959).